United States Patent
Devaux et al.

(10) Patent No.: US 8,994,873 B2
(45) Date of Patent: Mar. 31, 2015

(54) IMAGE-CAPTURE SYSTEM AND METHOD WITH TWO OPERATING MODES

(75) Inventors: Ghislain Devaux, Paris (FR); Frédéric Guichard, Paris (FR); Etienne Knauer, Boulogne Billancourt (FR); Bruno Liege, Boulogne Billancourt (FR); Hoang-Phi Nguyen, Paris (FR); Regis Tessieres, Paris (FR)

(73) Assignee: DXO Labs, Boulogne-Billancourt (FR)

( * ) Notice: Subject to any disclaimer, the term of this patent is extended or adjusted under 35 U.S.C. 154(b) by 559 days.

(21) Appl. No.: 13/388,099

(22) PCT Filed: Aug. 6, 2010

(86) PCT No.: PCT/FR2010/051671
§ 371 (c)(1),
(2), (4) Date: Jan. 31, 2012

(87) PCT Pub. No.: WO2011/018575
PCT Pub. Date: Feb. 17, 2011

(65) Prior Publication Data
US 2012/0127360 A1 May 24, 2012

(30) Foreign Application Priority Data
Aug. 10, 2009 (FR) ..................................... 09 55593

(51) Int. Cl.
*H04N 5/232* (2006.01)
*G03B 13/36* (2006.01)

(52) U.S. Cl.
CPC ............ *H04N 5/23212* (2013.01); *G03B 13/36* (2013.01); *H04N 5/23245* (2013.01)
USPC .......................................... 348/349; 348/345

(58) Field of Classification Search
CPC ........... H04N 5/23212; H04N 5/23245; G03B 13/36; G02B 7/36
See application file for complete search history.

(56) References Cited

U.S. PATENT DOCUMENTS

| | | | | |
|---|---|---|---|---|
| 6,151,415 | A * | 11/2000 | Acharya et al. | 382/255 |
| 6,198,506 | B1 | 3/2001 | Nakata et al. | |
| 8,049,811 | B2 * | 11/2011 | Gamadia et al. | 348/345 |
| 2005/0185086 | A1 | 8/2005 | Onozawa | |
| 2008/0158377 | A1 | 7/2008 | Chanas et al. | |
| 2009/0009653 | A1 * | 1/2009 | Tsai | 348/353 |
| 2009/0202235 | A1 * | 8/2009 | Li et al. | 396/125 |

FOREIGN PATENT DOCUMENTS

WO WO2006/095110 A2 9/2006

OTHER PUBLICATIONS

Jerome Buzzi et al., "Uniqueness of Blur Measure."
Al Bovik, "Handbook of Image & video Processing," Academic Press, pp. 415-430, 2000.
Mark D. Fairchild, "Color Appearance Models," Addison Wesley, pp. 30-33, 1997.

* cited by examiner

*Primary Examiner* — Luong T Nguyen
(74) *Attorney, Agent, or Firm* — Im IP Law PLLC; C. Andrew Im

(57) ABSTRACT

A system for capturing at least one image of a scene. The system estimates at least one value representative of the sharpness in at least one area of at least one initial captured image of a scene. The autofocus module captures the initial image with a predefined focus. On the basis of at least the value representative of the estimated sharpness, the system selects a first operating mode or a second operating mode. In the first mode, the autofocus module controls the focus of the system to capture a sharper image of the scene. In the second mode, the initial captured image or another captured image is processed by the digital processing unit, the other image being captured with the predefined focus.

15 Claims, 2 Drawing Sheets

IMAGE-CAPTURE SYSTEM AND METHOD WITH TWO OPERATING MODES

RELATED APPLICATIONS

This application is a §371 application from PCT/FR2010/051671 filed Aug. 6, 2010, which claims priority from French Patent Application No. 09 55593 filed Aug. 10, 2009, each of which is herein incorporated by reference in its entirety.

TECHNICAL FIELD OF THE INVENTION

This invention relates to the field of digital image-capture systems (fixed or animated) such as those contained in picture-taking devices, cameras, camera phones (mobile telephones capable of taking photos), scanners, faxes, endoscopes, surveillance cameras, toys, personal assistants, computers, heat cameras, ultrasound apparatuses, MRI (magnetic resonance imaging) apparatuses and X-ray apparatuses, etc.

It classically comprises a sensor with a plurality of light-sensitive elements, known as pixels, which transform a quantity of light received into digital values, and an optical system focusing the light towards the sensor.

The sensor can, for example, be a CCD (Charged Coupled Device), a CMOS (Complementary Metal Oxide Semiconductor), a CID (Charge Induced Device), an IRCCD (Infra-Red CCD), an ICCD (Intensified CCD), an EBCCD (Electron Bombarded CCD), an MIS (Metal Insulator Semiconductor), an APS (Active Pixel Sensor), a QWIP (Quantum Well Infrared Photo detector), an MQW (Multiple Quantum Well), a sensor sensitive to the light spectrum and/or to other electromagnetic spectral bands or other device. It can be associated with a Bayer filter in order to obtain a color image. Given that some of these sensors are capable of counting several million pixels, the unit currently used to count the pixels of a sensor is the Megapixel.

More precisely, the invention relates to the problem of obtaining sharp images by these image capture systems.

BACKGROUND OF RELATED ART

Image capture systems are known to comprise an optical system, a digital image sensor and an autofocus module.

Optical system refers to an optical system comprising one or several elements in particular including lenses, mirrors and/or diffractive elements.

The autofocus module comprises an automatic adjustment function for adjusting the system's focus so as to obtain a sharp image.

The focusing operation consists in converging the light rays exiting the optical system at the image sensor. The term converge involves minimizing the size of the point spread function obtained at the image sensor.

This focus is generally determined by successive iterations, by browsing through the different configurations accessible with the autofocus module and by measuring the sharpness of each of these configurations, for example for the green color component when this is a color image.

It should be noted that in this document, the terms "color component" and "color" correspond to the same notion.

The use of the autofocus module however presents two main disadvantages: the time taken to determine the optimal configuration can be long (this time is referred to as autofocus latency) and the amount of electricity consumed in particular to produce movements is high.

FIG. 5 demonstrates the electrical consumption of an image capture system with an autofocus module from the prior art: the curve L1 between the points J1 and K1 represents the electrical intensity values according to the defocus values in the case of a system focusing between an object placed at a focus distance of infinity and a close object. The point J1 corresponds to zero defocus (object at a distance of infinity) and the point K1 corresponds to maximum defocus (close object).

This figure is provided for illustration purposes with the level of electrical consumption required for defocus capable of varying according to the type of autofocus module used.

Moreover, this is why the autofocus module is not activated in most camera phones (it is set for an object at a distance of infinity) when the user uses the camera phone in preview mode (i.e. when the image is only captured at a low resolution (the resolution refers to the number of pixels contained in the image): for example 320 pixels*400 pixels at most, before the true image capture taken by the user, at a higher resolution). The autofocus mode is only activated at the time when the picture is taken by the user. The latter therefore a priori does not know whether the image taken at this instance will be sharp or blurred.

SUMMARY AND OBJECT OF THE INVENTION

A solution is therefore required for obtaining sharp images while minimizing energy consumption and autofocus latency.

To this end and according to a first aspect, the invention proposes a system for capturing digital images intended to capture at least one image of a scene, said system including an optical system, a sensor, an autofocus module for adjusting the focus of the system and digital processing means.

This system is designed to estimate a value representative of the sharpness in at least one area of at least one initial captured image of a scene, the autofocus module being positioned so as to capture the initial image with a predefined focus. On the basis of at least the value representative of the estimated sharpness, the system can select an operating mode from between a first mode and a second mode. In the first mode, the autofocus module is used to control the focus of the system in order to capture a sharper image of the scene; and in the second mode, the initial captured image or another captured image is processed by the digital processing means, the other image being captured with said predefined focus.

Such a system improves the sharpness of the images provided by the image capture system while reducing the latency and energy consumption required, by using digital processing operations where appropriate and by reserving the use of the autofocus module for cases where it is compulsory to improve sharpness.

The focus adjustment is generally performed using an actuator (voice coil technology, stepper motor, piezoelectric device, MEMS (Microelectromechanical Systems), USM (Ultra Sonic Motor) or any other means) to move the optical system and/or the sensor, or even to move elements within the optical system, or by using liquid lenses or any other electrical, mechanical and/or magnetic means modifying the shapes and/or positions of the elements making up the optical system, so that the sensor is in the plane of focus of the image of the scene captured.

The use of a liquid crystal phase modulator device (PDLC) is another example of modifying the properties of the optical system to adjust focus.

The invention includes the step of positioning the autofocus module to capture an image with a predefined focus. Predefined focus can be understood as the focus obtained when the autofocus module is not activated and advantageously any position in which focus remains stable without consuming electricity or by consuming as little as possible. Predefined focus can be obtained when the position of the autofocus module is at rest or in a position obtained after adjusting the focus.

Predefined focus can advantageously involve hyperfocal focusing for obtaining sharp images at a distance of infinity with a maximum depth of field, or another focus determined for example in order to maximize the depth of field of the second mode. Predefined focus can also depend on an adjustment made by the user or an automated adjustment, for example opening or changing the focal distance of the optical system. Predefined focus can also describe any position obtained after turning on the system or obtained during system operation and in particular after implementing the first mode.

The invention implements image processing means. The image processing means can be integrated into the sensor and the optical system or located in a separate apparatus connected to the image capture system by transmission means.

Image processing means refer to software receiving one or several images and performing processing operations on these images.

These processing operations can in particular include:
  calculating a corrected image, and/or
  performing measurements, and/or
  combining several images, and/or
  improving the accuracy of images, and/or
  improving the subjective quality of images, and/or
  detecting objects or persons in a scene, and/or
  adding objects or persons to a scene, and/or
  replacing or modifying objects or persons in a scene, and/or
  removing shadows in a scene, and/or
  adding shadows to a scene, and/or
  researching objects in an image base.

In one embodiment, the other image is for example captured subsequently to the initial image capture.

In one embodiment, the system is intended to capture a sequence of images and also comprises a device which, when at least one subsequent image is captured with the predefined focus or another focus and on the basis of at least one value representative of the sharpness estimated from the subsequent image, can select an operating mode from between the first mode and the second mode, in the second mode, the subsequent image or another image captured being processed by the digital processing means, the other image being captured with the same focus as the subsequent image.

In one embodiment, in the second operating mode, the digital processing means are capable of applying a digital image processing operation intended to improve the sharpness of the initial image, the subsequent image or another image captured, without implementing the autofocus module. In such an embodiment, the first and second operating modes are designed to obtain a sharper image of the scene.

In one embodiment, this other image is for example captured subsequently to the initial image capture.

In one embodiment of the image capture system according to the invention, the value representative of the sharpness is determined according to:
  a relation between the levels of sharpness of at least two respective color components in the initial image; and/or
  the comparison between the respective levels of sharpness of at least two color components in the initial image.

These provisions enable the operating mode to be selected according to the measurements performed in the initial image only.

In one embodiment, the image capture system is also capable, after selecting the first operating mode, of choosing a focus adjustment according to:
  a relation between the levels of sharpness of at least two respective colors determined according to the initial image; and/or
  an astigmatism measurement in at least one area of the initial image and on at least one color.

This provision therefore reduces the number of required iterations implemented by the autofocus function, thus reducing the latency and energy consumption required.

In one embodiment, the image capture system is also capable, after selecting the second operating mode and in at least one region of the image processed by the digital processing means, of identifying a sharper color component and a more blurred color component and of modifying the pixel intensity of the image processed for the more blurred color according to the pixel intensity of the image for the sharper color.

This provision therefore easily improves the sharpness of the image processed via digital processing.

According to a second aspect, the invention relates to a method for capturing images intended for a system including an optical system, a sensor, an autofocus module for adjusting the focus of the system and digital processing means, containing the following steps:
  estimating a value representative of the sharpness in at least one area of at least one initial captured image of a scene, said autofocus module being positioned so as to capture the initial image with a predefined focus; and on the basis of at least the value representative of the estimated sharpness, selecting an operating mode from between a first mode and a second mode,
  whereby in the first mode, the autofocus module is used to control the focus of the system in order to capture a sharper image of the scene; and
  in the second mode, the initial captured image is processed by the digital processing means, with the other image being captured with said predefined focus.

According to a third aspect, the invention relates to a computer program and/or electronic component to be installed within a processing unit of an image capture system intended to capture at least one image of a scene and including an optical system, a sensor, an autofocus module for adjusting the focus of the system, said program comprising instructions and/or said component comprising circuits to implement the steps of a method according to the second aspect of the invention upon the execution of the program and/or activation of the component by said processing module.

BRIEF DESCRIPTION OF THE DRAWINGS

Other characteristics and advantages of the invention will be discovered after reading the following description. This is purely for illustrational purposes and must be read using the appended figures, in which.

DETAILED DESCRIPTION OF THE EMBODIMENTS

Figure 1:
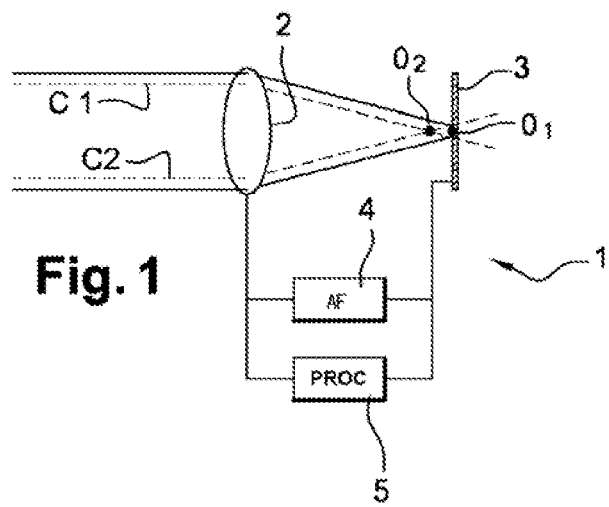
FIG. 1 represents an image capture system 1 according to one embodiment of the invention.

FIG. 1 represents an image capture system 1 according to one embodiment of the invention, for example a camera.

The camera 1 comprises an optical system 2, a sensor 3, an autofocus module 4 and a processing unit 5.

The autofocus module 4 is capable of automatically adjusting focus according to an image of the scene, in this case for example by varying the distance between the optical system 2 and the sensor 3 using a motor (other types of focus such as those previously mentioned can however be implemented in the invention).

The sensor 3 is equipped with sensitive elements for converting a flow of photons into an electric signal. In the embodiment considered, the sensitive elements are sensitive to three colors. The digital image captured is therefore a color image containing three respective color components.

It should be noted that the invention can be implemented with two or more colors.

In this embodiment, a captured image is considered to contain one blue color component C1 (wavelengths of substantially between 400 and 500 nm), one green color component C2 (wavelengths of substantially between 500 and 600 nm) and one red color component C3 (wavelengths of substantially between 600 and 700 nm).

In other embodiments, other components (for example infrared, ultraviolet, etc.) and/or any number of components more than or equal to two can be considered when implementing the invention.

Two main points must be recalled.

Firstly, the focus point of the optical system 2 is specific to each color, so that a focus point O1 specific to one color C1 is different from the focus point O2 of another color C2. Consequently, the image formed by a second color at the sensor is sharper or more blurred than the image formed by a first color, which reduces the sharpness of the overall image formed by the sensor.

Secondly, the focus point of the optical system 2 for a given wavelength varies according to the distance at which the scene represented in the image is located.

Figure 3:
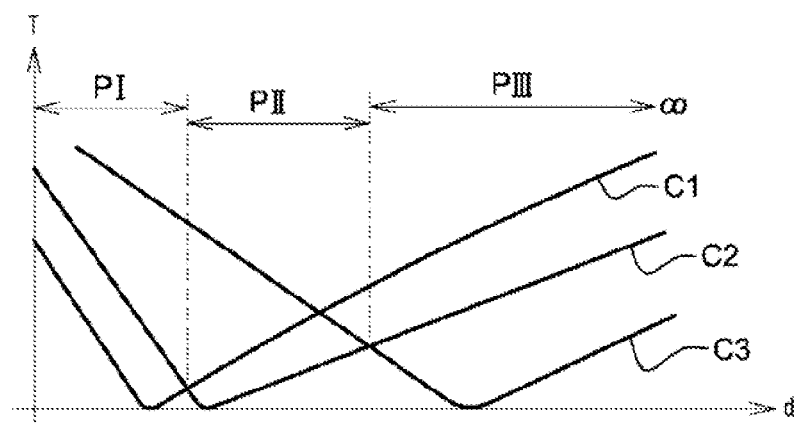
FIG. 3 illustrates the variations in sharpness of the image of an object according to different color components and according to the distance separating the object and the camera.

FIG. 3 illustrates the variations in sharpness of the color components C1, C2 and C3 of an object captured according to the distance d between the optical system 2 and the object being captured. The color components C1, C2 and C3 correspond for example to the blue, green and red components respectively. The abscissa represents the distance d and the ordinate represents the diameter T of the point spread function.

The range of distances d has been subdivided into three parts: the part where the blue component is the sharpest is the part PI, referred to as the "macro" part (typically less than 60 cm), the part PII where the green color component is sharper than the blue component and the red component is referred to as the "portrait" part (typically between 60 cm and 4 m) and the part PIII where the red component is sharper than the blue component and the green component is referred to as the "landscape" part (typically more than 4 m).

It should be noted that this specific order of focus between the colors is only provided for illustration purposes. The invention can be implemented for any order of focus between the colors, in particular in systems with chromatic inversion (produced for example using a diffractive object).

When considering an initial color image I of a scene captured by the camera 1, with the autofocus module 4 being set for an object at a distance of infinity or beyond (indeed, autofocus modules are often adjusted to distances beyond infinity in order to guarantee sharpness at a distance of infinity despite thermal differences and positioning errors which cause defocus).

Figure 2:
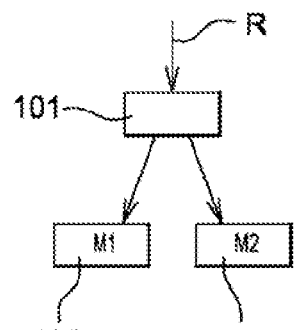
FIG. 2 represents the steps of a method according to the invention.

Camera 1 is designed to implement the following steps, described with reference to FIG. 2.

In a step 101, the processing unit 5 performs at least one sharpness measurement on a determined area Z in the image I, with the autofocus module 4 being positioned so as to capture the initial image with a predefined focus.

In one embodiment, for this measurement, the optical system is originally set to hyperfocus in order to benefit from a larger depth of field in the second mode (M2).

In one embodiment, the area Z is comprised of the entire image I and in other embodiments, the area Z corresponds to a selected group of pixels.

According to the sharpness measured and a selection rule R defined in particular according to the sharpness measured, the processing unit 5 selects an operating mode from between the mode M1 and the mode M2.

If the operating mode selected in step 101 is the mode M1, in step 102, the autofocus module 4 is activated so as to obtain an image of the scene with improved sharpness. An iterative focus adjustment process, for example an optimal distance between the optical system 2 and the sensor 3, corresponding to optimal sharpness (or at least to a level of sharpness greater than a determined minimum threshold) is therefore implemented, by calculating, for each modification in the distance separating the optical system 2 from the sensor 3, a respective measurement representative of the sharpness of the image of the scene captured for the considered distance separating the optical system 2 from the sensor 3.

If the operating mode selected in step 101 is the mode M2, in step 103, digital processing operations are applied by the processing unit 5 on the initial image of the scene captured (or potentially on another image), for example so as to obtain an image of the scene with improved sharpness, without implementing the autofocus function.

The content of the different steps is provided in more detail below.

Step 101

The sharpness measurement in the area Z of the image I performed by the processing unit 5 in step 101 can be an overall measurement on the image or on the other hand, vary according to color components considered on an individual basis.

In one embodiment of step 101, an overall sharpness measurement is performed and the selection rule R corresponds, for example, to the comparison between the sharpness measured and a determined threshold. If the sharpness measured is beneath the determined threshold, the operating mode M1 is selected. Otherwise, the operating mode M2 is selected.

In another embodiment of step 101, the processing unit 5 performs a sharpness measurement for a color component and selects an operating mode from between modes M1 and M2 by comparing the sharpness measurement to a determined threshold.

In another embodiment of step 101, the processing unit 5 performs a sharpness measurement for several color components and selects an operating mode from between modes M1 and M2 by comparing the sharpness measurements to the respective determined thresholds.

In another embodiment of step 101, the processing unit 5 performs a sharpness measurement according to each of two different directions and selects an operating mode from between modes M1 and M2 by comparing the sharpness measurements.

In another embodiment of step 101, the processing unit 5 performs a relative sharpness measurement between at least two color components. For example, it determines which color component is the sharpest in image I between the blue component and the green component. Then, if the blue component is the sharpest of the two blue and green components, the processing unit 5 selects the operating mode M1. Otherwise the operating mode M2 is selected.

This aforementioned embodiment for step 101 resorts to using the autofocus module 4 for a captured scene located in the "macro" PI part and to using a unique digital processing operation without implementing the autofocus module 4 for captured scenes located in the "portrait" PII and "landscape" PIII parts, with the selection between the two modes M1 and M2 being simply made on the basis of a comparison between the levels of sharpness of two color components.

For other embodiments, the mode M1 can be selected, for example for the "macro" and "portrait" parts, and the mode M2 for the "landscape" part.

In one embodiment, the operating mode M1 is selected when the two following conditions Cond1 and Cond2 are met:

Cond1: the scene is located in the macro area (i.e. the blue component is sharper than the green component);

Cond2: the sharpness of the blue component also being beneath a determined threshold.

Alternatively, the condition Cond2 takes into account the relative sharpness of two or more color components, and therefore varies according to a relationship between the levels of sharpness of several color components.

In another embodiment, the operating mode selected varies, for example, according to the comparison made between a threshold and a function of the levels of sharpness of different color components, for example the difference in sharpness between the components C1 and C3 divided by the sharpness of the component C2.

A relative sharpness measurement can vary according to a quotient or a difference between the sharpness measurement for a color component and the sharpness measurement for another color component.

The relative sharpness measurement of one color component compared to another is advantageous in relation to an absolute sharpness measurement for the image, as the former is more precise and does not depend on the content of the scene observed. Indeed, an absolute measurement is not reliable enough in some cases to determine whether mode M1 or M2 should be selected. For example, an absolute sharpness measurement can operate perfectly for a scene with high contrast such as a test chart, whereas it will not be reliable if the content of the scene is smooth.

Therefore, the use of an optical system is advantageous (for example a lens) employing longitudinal chromatic aberration in order to perform a relative sharpness measurement of a color component compared to another and have a more stable measurement that does not depend on the scene observed.

Other selection rules can be defined, for example combining the rules provided hereinafter or implementing other rules.

Furthermore, the invention applies with various known sharpness measurements, per color component or in an overall manner. A sharpness measurement can correspond to a scalar value or a vector.

For example, the sharpness of a color can correspond to the measurement of a value referred to as BXU which is a blur experience measurement as described in the article published in the "Proceedings of IEEE, International Conference of Image Processing, Singapore 2004" and entitled "Uniqueness of Blur Measure" by Jérôme BUZZI and Frédéric GUICHARD.

Sharpness can be indicated according to the variance in the point spread function or even using the MTF (Modulation Transfer Function), which is the Fourier transform of the point spread function.

Various measurement methods for measuring such sharpness are described in manuals and publications such as, for example, the "Handbook of image & Video processing" edited by Al Bovik and published by Academic press, pages 415 to 430.

In one embodiment, the sharpness of a color component is obtained by calculating a gradient.

For example, a sharpness value is estimated for the pixels of the area Z of the digital image by performing for each or some of the pixels P, a measurement M in the pixel P, for a given color component C, corresponding to the variation gradient of C in a neighborhood of P. This is obtained by the following calculation:

For a given color C, V(P) is considered to represent a neighborhood of the pixel P.

GM is noted, representing the median magnitude of the gradients in the neighborhood V(P), and SM representing the median magnitude of the differences between GM and the gradients in the neighborhood V(P).

A gradient is calculated by the magnitude of the difference in intensities between two pixels of the same color. The gradients in the neighborhood V(P) correspond to the gradients involving a predetermined number of pixel pairs in the neighborhood V(P).

The measurement M representative of the sharpness of the pixel P having a color C can be defined by the relationship between SM and GM. A value M (P, C) is thus obtained.

Whereas in an image capture apparatus with a standard autofocus module, the autofocus module must be activated in order to determine whether the image is sharp, which involves the acquisition of at least two images to compare their level of sharpness, an image capture apparatus according to this invention defines, with the capture of a single image, whether the activation of the autofocus module is required or not.

Step 102:

In one embodiment, when the operating mode Ml is selected, the processing unit 5 calculates a focus adjustment instruction, for example a distance to be applied between the optical system 2 and the sensor 3 for implementing the autofocus function and provides this to the autofocus module 4. This focus adjustment instruction is, for example, calculated according to one or several sharpness measurements performed before using the autofocus module, for example a sharpness measurement performed in step 101.

Figure 4:
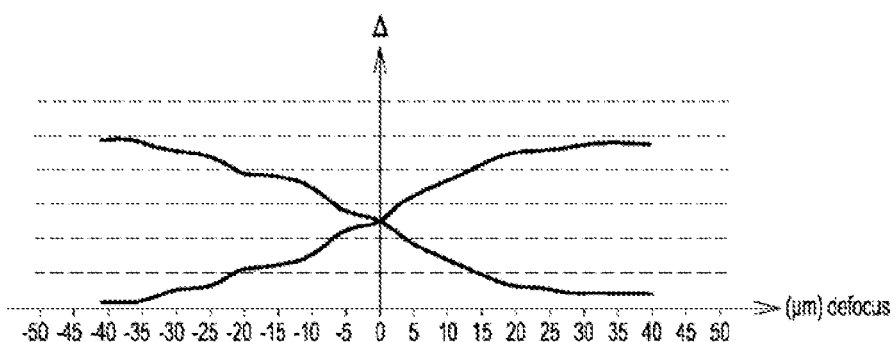
FIG. 4 represents the relative sharpness between two color components of an image according to image defocus.

For example, as illustrated in FIG. 4, based on the relative sharpness between two color components (in this case a graph drawn for the camera 1 representing the value A of the difference between the sharpness of the color C1 and that of the color C3 divided by the sharpness of the color C2 and the opposite difference) an image defocus value can be deduced, this defocus representing the focus adjustment to be implemented, in this case the distance variation to be applied between the sensor 3 and the optical system 2).

This provision accelerates the convergence of the iterative process implemented by the autofocus module 4 and therefore reduces the latency and energy consumption required.

In another embodiment, the dependence of astigmatism can be used with the focus in order to further reduce latency and more particularly when the value Δ is no longer linear with the defocus.

In the presence of astigmatism in an optical system, the shape of the point spread function depends on the focus. On either side of the focus point where the point spread function is symmetrical, one direction will be preferred when compared to another, which will lead to a sharp image in one direction and a blurred image in a perpendicular direction. Consequently, according to the direction of sharpness in an image, this can be connected to the defocus. For a symmetrical system with astigmatism that is not fully corrected (concerning a large majority of optical systems), this will appear in the field. During the design phase for the optical system, a correlation table can be drawn up between an astigmatism measurement and/or its direction with defocus of the optical system. Furthermore, for optical systems containing high levels of misaligned optical elements, a calibration phase can be considered, connecting an astigmatism measurement and/or its direction on the optical axis (centre of the image) with defocus. This is possible because, when a system is comprised of elements misaligned in relation to each other, astigmatism is present in the centre of the image.

Furthermore, this defocus measurement, using the astigmatism, is relatively insensitive to the contents of the scene, as the astigmatism differs according to the color component considered, which differentiates between astigmatism originating from the optical system and therefore characteristic of defocus and that originating from the scene, which does not depend on the color component.

Step 103:

In one embodiment, when the operating mode M2 is selected, the processing unit 5 implements digital processing operations for the initial image I and does not implement the autofocus function.

The digital processing operations performed can vary: for example shape recognition, white balance adjustment, tone curve adjustment, dematrixing, etc.

In one embodiment, the digital processing operations correspond to the processing operations described in document PCT/FR2006/050197, adapted to improve the sharpness of at least one color component by choosing from the image's colors at least one color component referred to as the "sharp color" and by reflecting the sharpness of the sharp color component onto at least one other more blurred color component.

Therefore, by considering the aforementioned example of embodiment, wherein the operating mode M2 was selected after determining that the sharpness of the blue color component C1 was lower than the sharpness of the green color component C2.

In the following step, the sharpest color component is determined from between the color component C2 and the color component C3. The color component determined as the sharpest is hereinafter referred to as the sharp color and the two other color components are hereinafter referred to as the components requiring improvement.

In this example, CA, CO and CN are the respective intensities of a pixel, characterized by grey levels and representative of the improved color component, the color component requiring improvement and the sharp color component respectively.

The sharpness of the sharp color component is reflected onto the color component requiring improvement using a filter F according to a formula such as:

$$CA = CN + F(CO - CN)$$

This removes the high frequencies of the color component requiring improvement and replaces these with the high frequencies of the sharp color component.

Typically, the filter F will have the specific function of removing the details of the image on which it is applied. In order to achieve this, a linear low-pass (or median) filter can be used. Many known non-linear filters can also be used with the specific function of removing details in a similar manner to that of a median filter.

It should be reminded at this stage that the human retina has a particularly high level of sensitivity, with regard to the details of an image, to the green color such that the adjustment of optical systems generally aims at obtaining a high level of sharpness for this color over a certain adjustment range (for example, refer to pages 30 to 33 of the works "Color appearance models" by Mark D. Fairchild edited by Addison Wesley).

Therefore, according to an observation specific to this invention, an optical device producing images, the sharpness of which is not satisfactory to the human eye, can present a satisfactory level of sharpness for one of its colors, such as the color blue or red, for which the eye is less sensitive when considering the details.

Typically, for an optical system focused at a hyperfocal distance, considering an image with a close object and a faraway object, the sharpness of the faraway object is generally often determined using a green color whereas the sharpness of the close object is improved by taking into account the blue color.

It is therefore important that the areas of an image can be improved according to different sharp colors according to the relative sharpness between two colors.

Therefore, in one embodiment of the invention, the image I is broken down into areas. Then, by successively considering each area, the sharpest color for that area is identified. In one embodiment, the sharpness of the sharpest color is reflected onto the other color components in the area considered. In another embodiment, an overall correction is applied to the image, which is calculated using weight factors as a weight factor is representative of the number of times that an associated sharp color has been identified in the areas.

Such a processing operation performed according to the characteristics of the different areas of the image is advantageous when compared to the use of an autofocus module within an image capture system from the prior art. Indeed, in the example of a scene with objects located at different distances, an image capture system from the prior art will focus on one of these objects alone, whereas according to the invention, a sharp image is obtained for all objects considered.

In one embodiment, the processing operations described in steps 101, 102 and 103 are implemented by the processing unit 5 after the execution of a program comprising instructions for implementing the steps incumbent upon the processing unit 5 during the execution of the program by the calculation means of the processing unit 5.

In the aforementioned embodiment, the sharpness improvement step 103 has been performed on the initial image I captured after selecting the operating mode M2.

In another embodiment, the improvement process in step 103 is performed on one or several other images, for example images captured after the initial image, for example in the event of video images with the other image being captured with the predefined focus.

The implementation of the invention produces particularly advantageous results when capturing video images.

Indeed, the latency caused by the iterative functioning of the autofocus module was very disadvantageous when capturing video images, above all when the object captured was moving, which also produced oscillation phenomena in terms of focus when viewing adjusted images.

This invention considerably reduces the oscillation phenomena encountered and the latency time required to obtain a sharp image when capturing video images. Indeed, it considerably reduces the use of the autofocus module when the operating mode M2 can be selected, which is particularly beneficial with moving objects. This results in a certain manner to stabilizing the image.

Stabilization is increased further when a prior focus adjustment determined according to a sharpness measurement performed is previously applied to the autofocus module, as indicated in the aforementioned description for step 102.

The invention also increases the level of reliability of the image stabilization operation, intended to compensate for the level of blur caused by movement, not of the scene itself but of the optical system/sensor, using a digital and/or optical correction process (by moving the lenses for example).

By being much faster to converge in mode M1, the stabilization measurement performed on a sharp image is more reliable. In mode M2, without using the autofocus module, the image is sharp and the measurement used for image stabilization is more reliable.

Therefore, as the latency is reduced, the sharp image is more quickly obtained and therefore the stabilization measurement is more reliable. With regard to autofocus modules from the prior art, the oscillations caused by the dichotomy when moving itself into the correct configuration makes the image stabilization measurement difficult.

Figure 6:
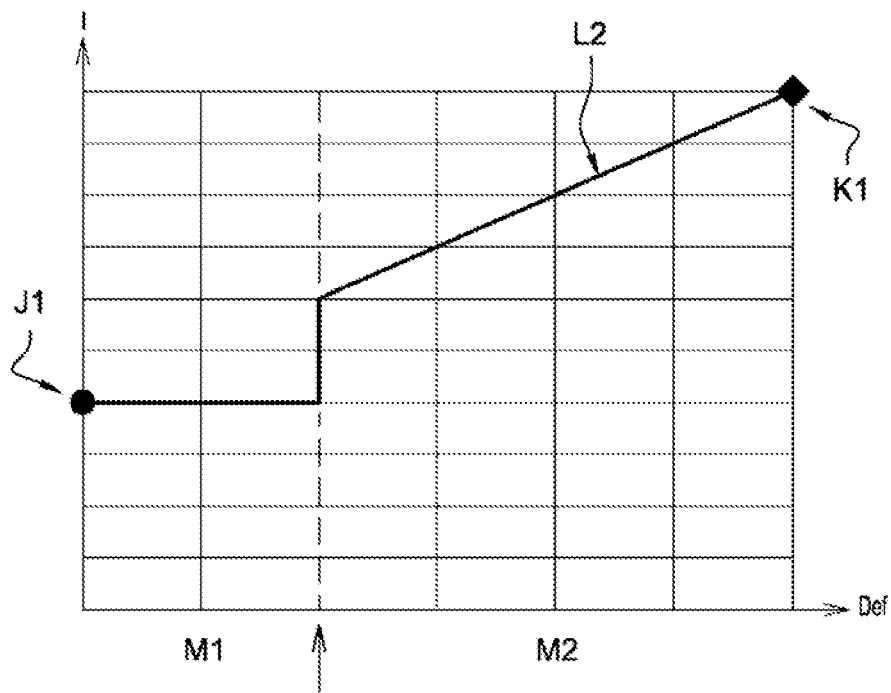
FIG. 6 illustrates the electrical consumption of an image capture system of the invention according to defocus.

FIG. 6 demonstrates the electrical consumption of an image capture system according to the invention: the curve L2 between the points J1 and K1 represents the electrical intensity values according to the defocus values (Def) in the case of an optical system focusing between a focus distance of infinity and a given close distance. The point J1 corresponds to zero defocus (object at a distance of infinity) and the point K1 corresponds to maximum defocus (close object).

The vertical dotted line indicated by the arrow marks the passage from the operating mode M2 (to the left of this vertical line) to the operating mode M1 (to the right of this vertical line).

Figure 5:
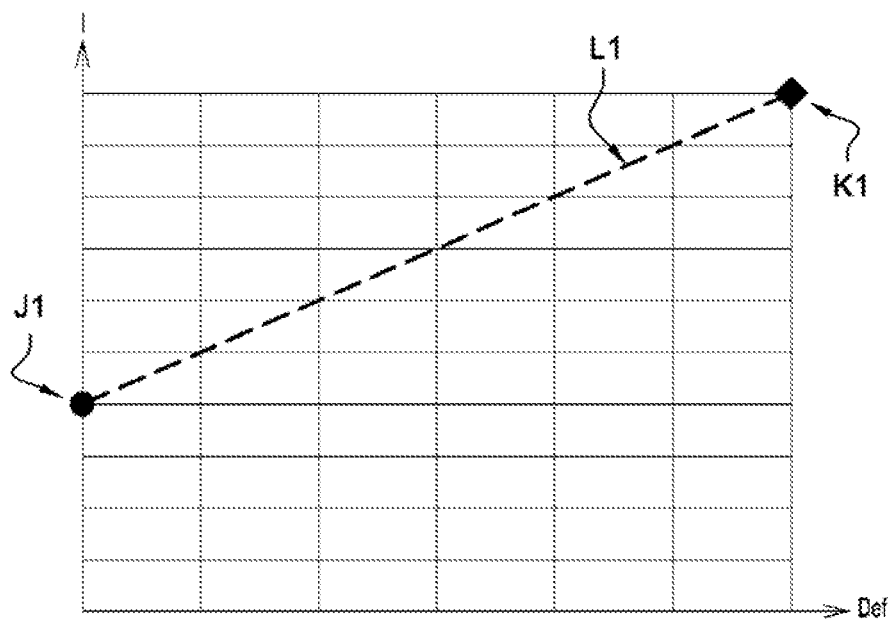
FIG. 5 illustrates the electrical consumption of an image capture system from the prior art, with a standard autofocus module according to defocus.

Therefore, in the operating mode M1, the electrical consumption within an image capture system according to the invention is equal to that of a system from the prior art for the same level of defocus (refer to FIG. 5). However, in the operating mode M1, thanks to the prior supply of a focus instruction, the curve L1 is not travelled several times within the scope of an iterative dichotomy process in order to determine the focus position such as in the prior art.

For all defocus values in the operating mode M2, the electrical consumption within an image capture system according to the invention is equal to that of a system from the prior art for zero defocus, i.e. at minimum consumption.

For example, in one aforementioned embodiment where the operating mode M2 corresponds to the Portrait and Landscape parts, and the operating mode M1 corresponds to the Macro part, such minimum consumption occurs for scenes located at a distance from the system of between a distance of infinity and approximately 60 cm, which corresponds to most uses made of image capture systems.

This invention therefore restricts the use of the autofocus module to a limited number of cases, when sharpness improvement is not sufficient or appropriate when performed by a digital processing operation, thus enabling the sharpness of a sharper color to be transferred to one or several more blurred colors. The invention therefore improves the sharpness of the images captured while limiting energy consumption and autofocus latency.

An autofocus adjustment can therefore be performed in camera phones, even in preview mode. Furthermore, when taking videos, the successive images captured can also be made sharp (which was not possible beforehand, with the adjustment operation performed by the autofocus module upon each video image not being possible due to the rapid succession of images).

The invention claimed is:

1. A system for capturing at least one image of a scene, comprising:
    an optical system;
    a sensor;
    an autofocus module to adjust a focus of the optical system and to capture at least one initial captured image of a scene with a predefined focus; and
    a digital processing unit to estimate at least one value representative of the sharpness in at least one area of said at least one initial captured image of the scene;
    wherein the system selects a first operating mode or a second operating mode based on said at least one value representative of estimated sharpness;
    wherein the autofocus module is activated to control the focus of the optical system to capture an image of the scene with improved sharpness in the first operating mode; and
    wherein the digital processing unit processes said at least one initial captured image or another image captured with the predefined focus in the second operating mode.

2. The system of claim 1, wherein the sensor captures a sequence of images; wherein the digital processing unit selects between the first and second operating mode when at least one subsequent image is captured by the sensor and based on said at least one value representative of the sharpness estimated from said at least one subsequent captured image; and wherein the digital processing unit processes said at least one subsequent captured image or another image captured with a same focus as said at least one subsequent image in the second operating mode.

3. The system of claim 1, wherein, the digital processing unit applies a digital image processing operation to improve the sharpness of said at least one initial captured image, a subsequent captured image or another captured image without invoking the autofocus module in the second operating mode.

4. The system of claim 1, wherein the digital processing unit determines said at least one value representative of the sharpness according to at least one of the following: a relation between levels of sharpness of at least two respective color components in said at least one initial captured image; or a comparison between respective levels of sharpness of at least two respective color components in said at least one initial captured image.

5. The system of claim 1, wherein the autofocus module adjusts the focus of the optical system in the first operating mode according to at least one of the following: a relation between levels of sharpness of at least two respective color components in said at least one initial captured image; or an astigmatism measurement in said at least one area of said at least one initial captured image and on at least one color.

6. The system of claim 1, wherein the digital processing unit identifies a sharp color component and a blurred color component in at least one region of an image processed by the digital processing unit in the second operating mode, and modifies pixel intensity of the blurred color component of the image according to the pixel intensity of the sharp color component of the image.

7. A method for capturing images by an image capture system comprising an optical system, a sensor, an autofocus module for adjusting the focus of the optical system and a digital processing unit, comprising the steps of:
estimating at least one value representative of sharpness in at least one area of at least one initial image of a scene captured by the autofocus module with a predefined focus by the digital processing unit;
selecting a first or second operating mode by the digital processing unit based on said at least one value representative of the estimated sharpness;
activating the autofocus module to control a focus of the optical system and the sensor to capture an image of the scene with improved sharpness in the first operating mode; and
processing said at least one initial captured image or another image captured with the predefined focus by the digital processing unit in the second operating mode.

8. The method of claim 7, further comprising the steps of:
capturing a sequence of images by the sensor;
selecting between the first and second operating mode by the digital processing unit when at least one subsequent image is captured by the sensor and based on said at least one value representative of the sharpness estimated from said at least one subsequent captured image; and
processing said at least one subsequent captured image or another image captured with a same focus as said at least one subsequent captured image by the digital processing unit in the second operating mode.

9. The method of claim 7, further comprising the step of applying a digital image processing operation to improve the sharpness of said at least one initial captured image, a subsequent captured image or another captured image by the digital processing unit without invoking the autofocus module in the second operating mode.

10. The method of claim of claim 7, further comprising the step of determining said at least one value representative of the sharpness by the digital processing unit according to at least one of the following: a relation between levels of sharpness of at least two respective color components in said at least one initial captured image; or a comparison between respective levels of sharpness of at least two respective color components in said at least one initial captured image.

11. The method of claim 7, further comprising the step of adjusting the focus of the optical system in the first operating mode by the autofocus module according to at least one of the following: a relation between levels of sharpness of at least two respective color components in said at least one initial captured image; or an astigmatism measurement in said at least one area of said at least one initial captured image and on at least one color.

12. The method of claim 7, further comprising the step of adjusting the focus of the optical system in the first operating mode by the autofocus module according to an astigmatism measurement in said at least one area of said at least one initial captured image and on at least one color.

13. The method of claim 7, further comprising the step of identifying a sharp color component and a blurred color component in at least one region of an image processed by the digital processing unit in the second operating mode; and modifying pixel intensity of the blurred color component of the image by the digital processing unit according to the pixel intensity of the sharp color component of the image.

14. The method of claim 7, wherein the steps are performed by a computer executable program installed in the digital processing unit of the image capture system.

15. The method of claim 7, wherein the steps are implemented by an electronic component within the digital processing unit.

* * * * *